No. 815,145. PATENTED MAR. 13, 1906.
M. CARMICKLE.
MILKING MACHINE.
APPLICATION FILED NOV. 19, 1904.
2 SHEETS—SHEET 2.
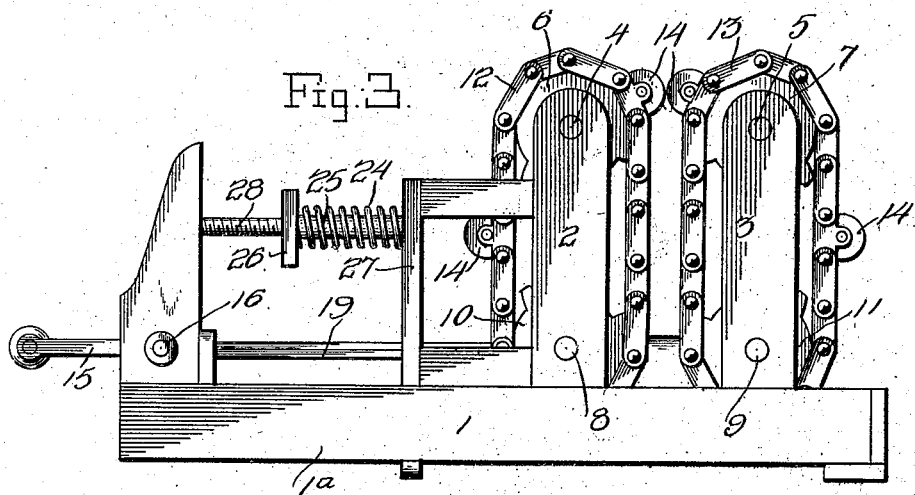
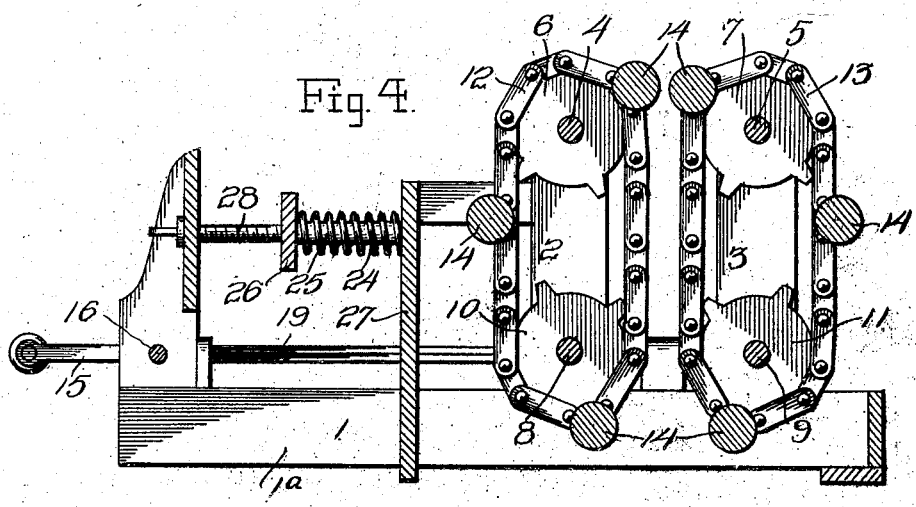
Witnesses
Inventor
M. Carmickle
by
Chandler & Chandler
Attorneys

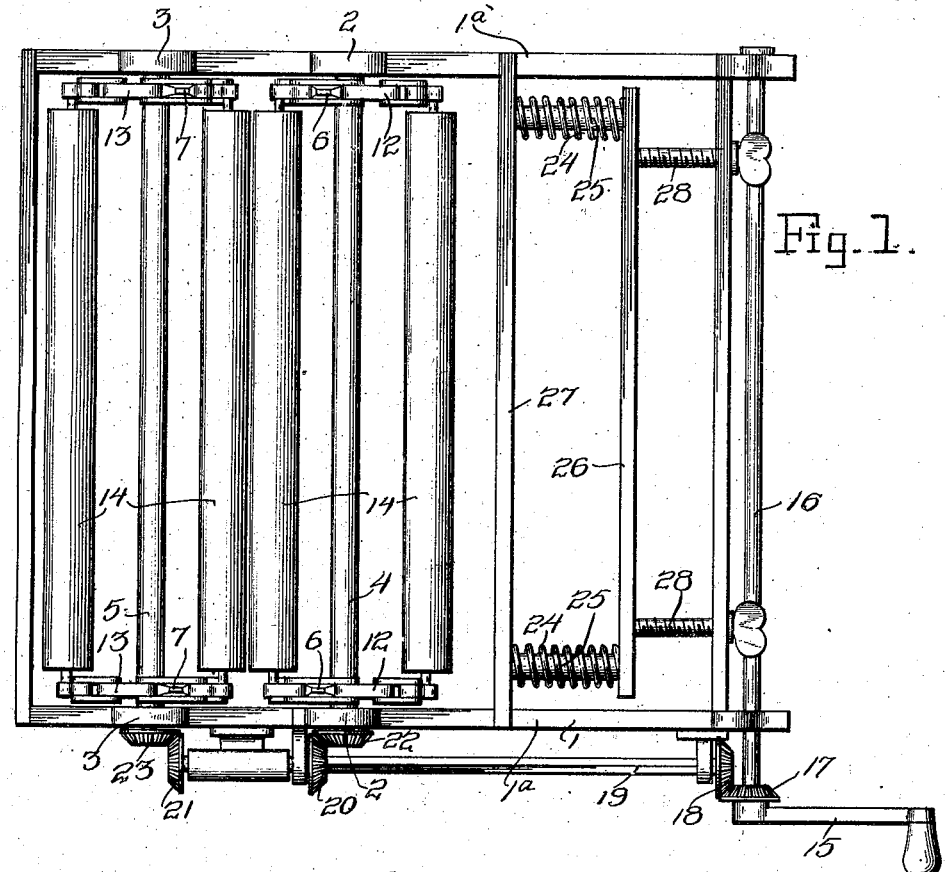

UNITED STATES PATENT OFFICE.

MARK CARMICKLE, OF THIEF RIVER FALLS, MINNESOTA.

MILKING-MACHINE.

No. 815,145. Specification of Letters Patent. Patented March 13, 1906.

Application filed November 19, 1904. Serial No. 233,449.

*To all whom it may concern:*

Be it known that I, MARK CARMICKLE, a citizen of the United States, residing at Thief River Falls, in the county of Red Lake, State of Minnesota, have invented certain new and useful Improvements in Milking-Machines; and I do hereby declare the following to be a full, clear, and exact description of the invention, such as will enable others skilled in the art to which it appertains to make and use the same.

This invention relates to a milking-machine in which soft-rubber rollers are employed to engage the teats of the cow's udder and wring or milk them, the milk being caught in a hopper and conveyed to a pail. It is designed to set the machine on a stool or other thing of the kind and to adjust the device so as to fit the teats of the cow and perform the work of milking without annoying or worrying the animal and to do the work completely and expeditiously.

In the accompanying drawings, which form a part of this specification, I have not attempted to do more than show one form of naked means which I may use, it being understood that these may be varied in form and arrangement without departing from the nature or spirit of the invention, and it being also understood that the machine will be used on a stool or other device and that the sprocket-wheels, chains, and gear-wheels will be properly housed in, so as to protect the milking devices proper.

The same symbols of reference indicate the same parts or features, as the case may be, wherever they occur.

Of the drawings, Figure 1 is a plan view of the machine. Fig. 2 is a view of what may be called the "right-hand" side of the machine. Fig. 3 is a left-hand side view. Fig. 4 is a longitudinal central sectional view.

In the drawings, 1 designates the frame, by which it is designed to indicate the stationary and supporting part of the work.

2 3 designate uprights on each side of the machine, in the upper ends of which there are journaled shafts 4 5, each carrying on its end a sprocket-wheel 6 7, and in the lower parts of said uprights there are also shafts 8 9, provided with sprocket-wheels 10 11. Over the sprocket-wheels 6 7 and 10 11 there pass sprocket-chains 12 13, each carrying, say, three soft-rubber rollers 14.

15 is a crank fixed on the outer end of a shaft 16, which is provided with a bevel-gear 17, adjacent to the crank, and which bevel-gear meshes with a bevel-gear 18 on the end of a transverse shaft 19, having bearings connected with the side of the machine. The said shaft 19 is also provided with bevel-gears 20 21, which mesh with and drive the bevel-gears 22 23 on the ends of the sprocket-wheel shafts 8 9 and operate the same and the sprocket-wheels and soft-rubber rollers carried by them.

By the means described it will be seen that by turning the crank 15 the sprocket-chains and their rollers will be carried around in unison and that by arranging the machine so that pairs of the rollers will engage the teats of a cow between them they will perform the operation of milking by wringing or stripping and that the milk will be caught in a pail or hopper, as the case may be.

The uprights 2 and all their connections and bearings slide on the sills 1ª 1ª and are yieldingly held pressed toward the adjacent set of rollers and their connections by the springs 24, surrounding the pins 25, which pass through holes in the bar 26, the other end of said pins being connected with the bar 27, which is made adjustable by the thumb-screws 28, tapped into a part of the framework, so that the sets of rollers may be adjusted closer together or allowed to work farther apart in accordance with circumstances or the size of the teats of the cow being milked.

The machine as a whole is simple in construction and complete in its operation.

I claim—

1. A milking-machine comprising a frame having uprights, one of said uprights being slidably mounted thereon, upper and lower shafts journaled in said uprights, sprocket-wheels carried by said shafts, chains connecting said sprocket-wheels, milking-rollers carried by the chains, gears carried by the said lower shafts at one end thereof, bearings associated with the said frame, a shaft rotatably mounted in said bearings, gears on said last-named shaft, one of said gears being adjustable longitudinally of the said shaft, and means for rotating said shaft.

2. A milking-machine comprising a frame having uprights arranged in pairs, one of said uprights being slidably mounted on said frame, means for adjusting the said upright, upper and lower shafts journaled in said uprights, sprocket-wheels carried by said shaft, chains connecting said sprocket-wheel, milking-rollers carried by the chains, gears carried by the said shafts at one end thereof, bearings associated with the said frame, a shaft rotatably mounted in said bearing, gears on said last-named shaft, one of said gears being adjustable longitudinally of the said shaft, and means for rotating said shaft.

3. A milking-machine comprising a frame, uprights arranged in pairs thereon, a guide carried by one of said uprights, said guide being slidably engaged with the sides of said frame and including a cross-piece having openings therein, pins engaged in said openings, a bar connected to said pins, springs engaged on said pins between said cross-piece and said bar, set-screws associated with the frame for engagement with the said bar, bearings on said frame, a shaft rotatably mounted in said bearings, gears on said shaft, one of said gears being adjustable longitudinally of the said shaft, and means for rotating said shaft.

In testimony whereof I affix my signature in presence of two witnesses.

MARK CARMICKLE.

Witnesses:
L. A. DRAKE,
J. L. BOUB.